(12) United States Patent
Tien et al.

(10) Patent No.: US 9,372,382 B2
(45) Date of Patent: Jun. 21, 2016

(54) ROTARY MECHANISM

(71) Applicant: HTC Corporation, Taoyuan, Taoyuan County (TW)

(72) Inventors: Ernest Euan Tien, Taoyuan (TW); Chun-Ta Huang, Taoyuan (TW)

(73) Assignee: HTC CORPORATION, TAOYUAN (TW)

( * ) Notice: Subject to any disclaimer, the term of this patent is extended or adjusted under 35 U.S.C. 154(b) by 27 days.

(21) Appl. No.: 14/541,996

(22) Filed: Nov. 14, 2014

(65) Prior Publication Data

US 2016/0139494 A1    May 19, 2016

(51) Int. Cl.
 *F03G 1/00* (2006.01)
 *G03B 17/56* (2006.01)

(52) U.S. Cl.
 CPC .................................... *G03B 17/561* (2013.01)

(58) Field of Classification Search
 CPC ................ F03G 1/00; F03G 1/02; F03G 1/08
 USPC ........................................ 185/37, 39; 396/428
 See application file for complete search history.

(56) References Cited

U.S. PATENT DOCUMENTS

| | | | | | |
|---|---|---|---|---|---|
| 1,503,437 | A | * | 7/1924 | James | G03B 37/02 396/20 |
| 2,372,932 | A | * | 4/1945 | Brockman | G03B 37/00 185/39 |
| 2,581,633 | A | * | 1/1952 | Combe | F03G 1/00 185/37 |
| 4,293,057 | A | * | 10/1981 | Globus | G03B 37/02 185/37 |
| 8,379,089 | B2 | | 2/2013 | Lee | |
| 2006/0175483 | A1 | | 8/2006 | Osaka | |
| 2013/0343743 | A1 | | 12/2013 | Yen | |

FOREIGN PATENT DOCUMENTS

| | | |
|---|---|---|
| JP | 2001-260814 A | 9/2001 |
| TW | M353744 U | 4/2009 |
| TW | 201409160 A | 3/2014 |
| WO | WO 2009/107793 A1 | 9/2009 |

* cited by examiner

*Primary Examiner* — Phillip A Johnson
(74) *Attorney, Agent, or Firm* — Birch, Stewart, Kolasch & Birch, LLP (57) ABSTRACT

A rotary mechanism is provided, including a first housing, a second housing, a rotary module, an elastic element, and a speed-reduction module. The rotary module connects to the first housing and extends therefrom to connect with the second housing. The elastic element connects the second housing and the rotary module. The speed-reduction module connects to the rotary module. When an external force is exerted on the second housing, and the second housing rotates relative to the first housing along a first direction, the elastic element stores an elastic potential energy. When the external force is released, the second housing rotates relative to the first housing along a second direction by the elastic force. The second direction is opposite to the first direction, and the speed-reduction module reduces the rotary speed of the second housing relative to the first housing.

18 Claims, 12 Drawing Sheets

ROTARY MECHANISM

BACKGROUND OF THE INVENTION

1. Field of the Invention

The application relates in general to a rotary mechanism, and in particular, to a rotary mechanism with a speed-reduction module.

2. Description of the Related Art

With the progress of technology, a lot of electronic devices can photograph or record video (for example, a smartphone or a digital camera), and a lot of camera modes can be chosen, such as the panorama time-lapse or continuous shooting. To execute the aforementioned functions, the smartphone or the digital camera usually have to rotate together, thus, some rotary mechanisms have been developed.

However, conventional rotary mechanisms usually include motors and complex circuits, such that when unexpected vibrations happen, the images or video may have poor quality. Furthermore, conventional rotary mechanisms can be hard to carry or use in water.

BRIEF SUMMARY OF INVENTION

To address the deficiency of conventional rotary mechanisms, an embodiment of the invention provides a rotary mechanism for supporting and rotating an electronic device, including a first housing, a second housing, a rotary module, an elastic element, and a speed-reduction module. The rotary module connects to the first housing and extends therefrom to connect with the second housing. The elastic element connects the second housing and the rotary module. The speed-reduction module connects to the rotary module. When an external force is exerted on the second housing, and the second housing rotates along a first direction relative to the first housing, the elastic element deforms and stores an elastic potential energy. When the external force is released, the second housing rotates relative to the first housing along a second direction by an elastic force from the elastic element to release the elastic potential energy. The second direction is opposite to the first direction, and the speed-reduction module reduces the rotary speed of the second housing relative to the first housing.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the rotary mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
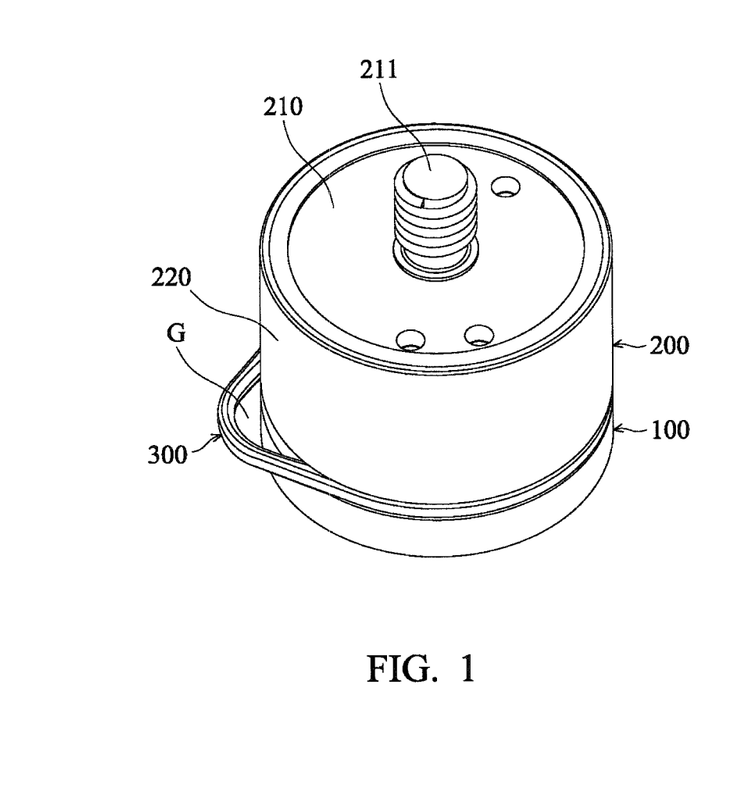
FIG. 1 is a schematic diagram of a rotary mechanism according to an embodiment of the invention.

Referring to FIG. 1, a rotary mechanism according to an embodiment of the invention primarily comprises a first housing 100, a second housing 200, and an annular member 300. The annular member 300 is disposed between the first housing 100 and second housing 200, and protrudes from a side of the second housing 200. Moreover, a gap G is formed between the annular member 300 and the second housing 200, such that a rope (not shown) can pass through the gap G for easy carrying. The second housing 200 comprises a disc-shaped cover 210 and a hollow frame 220, wherein an engagement structure 211 with screw thread is formed on the cover 210 to join the electronic device capable of image capturing, such as the camera shown in FIG. 3C or a mobile phone which is capable of photography or video recording. In this embodiment, the rotary mechanism has a substantially cylindrical shape. The diameter of the cylinder is about 20-40 mm (26 mm for example) and the height of the cylinder is about 10-30 mm (20 mm for example), wherein the height of the second housing 200 is about 5-20 mm (12 mm for example).

Figure 2:
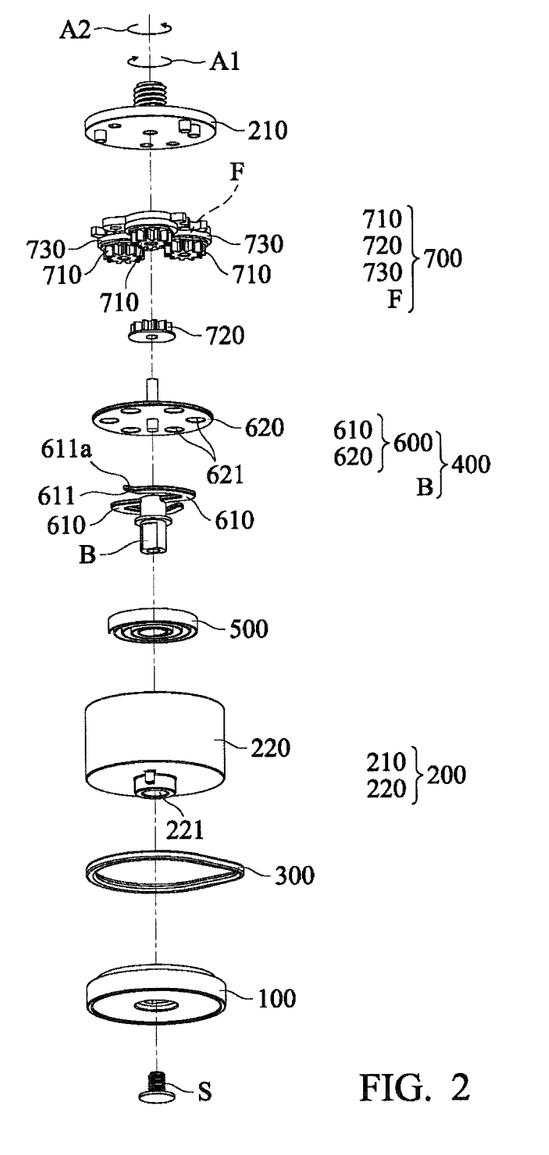
FIG. 2 is an exploded diagram of the rotary mechanism in FIG. 1.
Figure 3A:
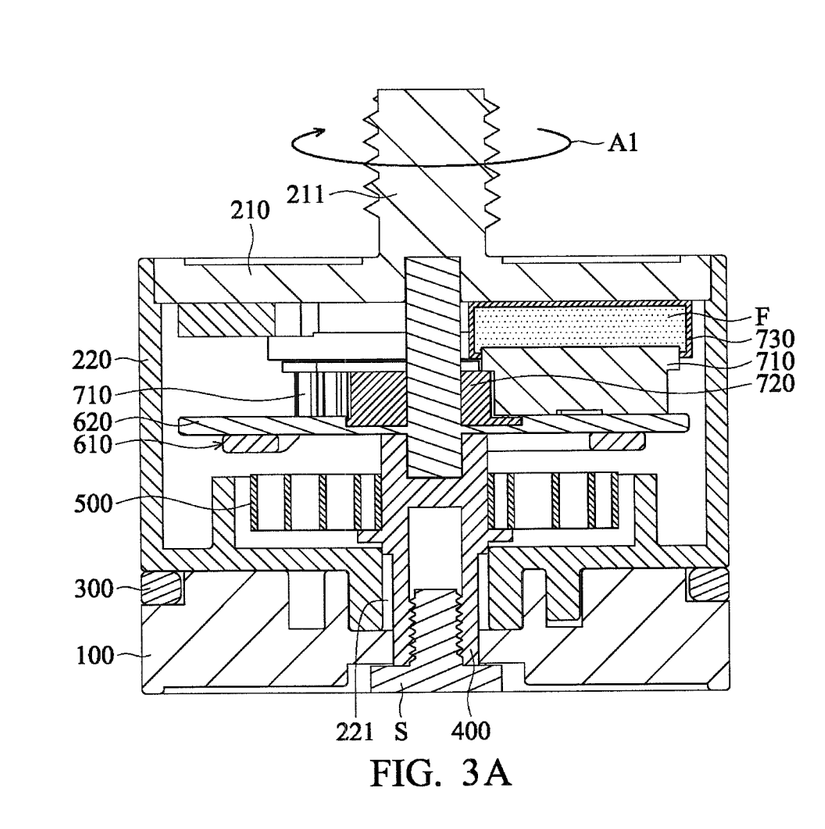
FIG. 3A is a cross-section view of the rotary mechanism after assembly.

FIG. 2 is an exploded diagram of the rotary mechanism in FIG. 1, and FIG. 3A is a cross-sectional view of the rotary mechanism after assembly. As shown in FIGS. 2 and 3A, the rotary mechanism further comprises a rotary module 400, an elastic element 500, and a speed-reduction module 700. The rotary module 400 is fixed to the first housing 100 by a screw S, extended through the second housing 200 and the annular member 300 via a through hole 221 of the frame 220 (FIG. 3A), and pivotally connected to the cover 210. In this embodiment, the elastic element 500 is a spiral spring disposed in the second housing 200 and annularly disposed around the rotary module 400. Two ends of the elastic element 500 respectively connect to the inner wall of the frame 200 and the rotary module 400. In some embodiments, the elastic element 500 can be a torsion spring or another type of spring.

The rotary module 400 comprises a main body B and a unidirectional rotation unit 600. The unidirectional rotation unit 600 comprises two first members 610 and a second member 620, wherein the second member 620 can only rotate relative to the first member 610 along a first direction A1. That is, when the user intends to rotate the second member 620 along a second direction A2 (opposite to the first direction A1) relative to the first member 610, interference between the first and second members 610 and 620 occurs, such that the rotation of the second member 620 relative to the first member 610 is prohibited. In this embodiment, two first members 610 are fixed to the main body B and extend outwardly therefrom. An abutting portion 611 is formed at the end of each first member 610, including a sloping surface 611a facing the second member 620. It should be noted that the first member 610 can be a flexible element (such as a metal spring plate), and the second member 620 can be a rotary element having a plurality of recesses 621, wherein the positions of the recesses 621 correspond to a moving path of the abutting portion 611 during rotation of the main body B.

In this embodiment, the speed-reduction module 700 comprises three first gears 710, three hollow members 730, and damping fluids F accommodated in the hollow members 730 (FIG. 3A). Three hollow members 730 are fixed to the cover 210, and the three first gears 710 respectively extend to the three hollow members 730 and contact the damping fluids F. Furthermore, a second gear 720 is fixed to the second member 620 and engaged with the first gears 710. The number of the first members 610, the first gears 710, and the hollow members 730 can be adjusted to meet requirements, such as one first member 610, one first gear 710, and one hollow member 730.

Figure 3B:
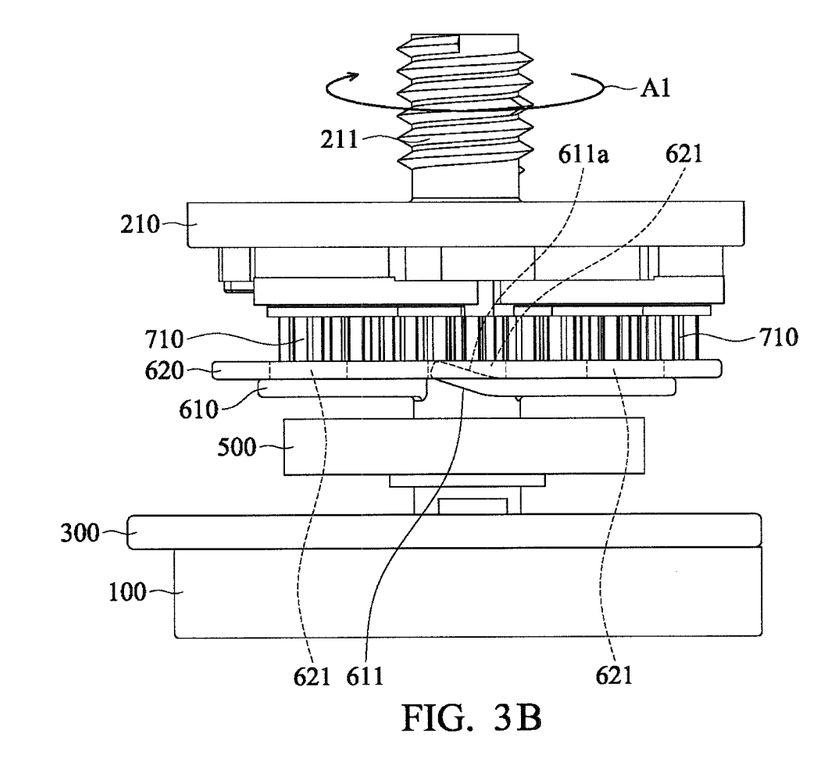
FIG. 3B is a schematic diagram representing an abutting portion accommodated in a recess.
Figure 3C:
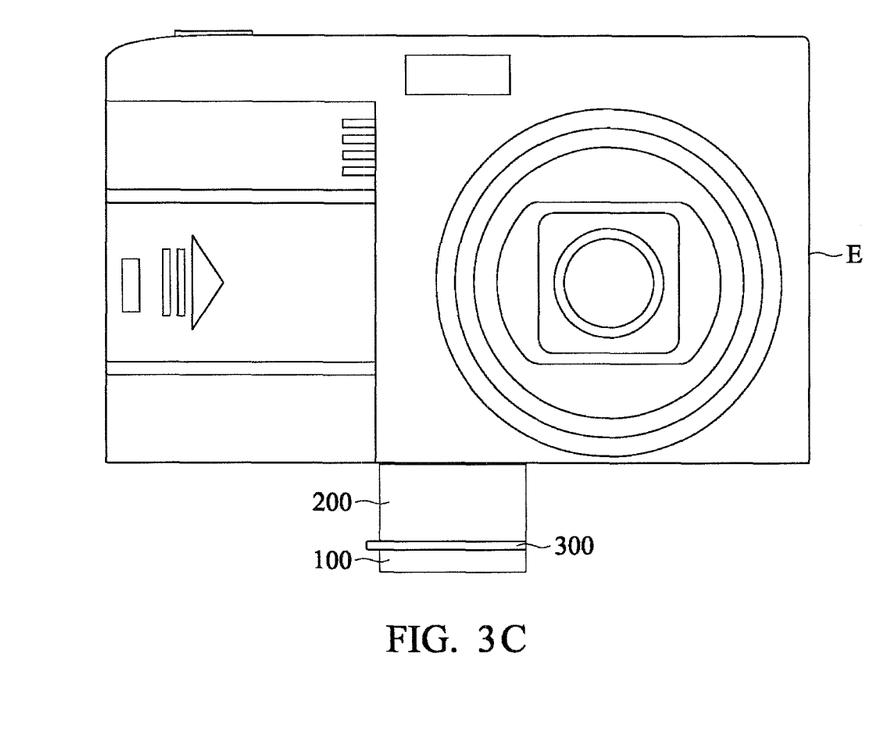
FIG. 3C is a schematic diagram representing an electronic device connected to the rotary mechanism.

FIG. 3B is a schematic diagram representing the abutting portion 611 accommodated in the recess 621 (the frame 220 is omitted). Referring to FIGS. 3A-3C, when the rotary mechanism is in an initial state, an electronic device E can be fixed to the cover 210 by the engagement structure 211 (FIG. 3C), and the abutting portion 611 of the first member 610 is accommodated in the recess 621 of the second member 620 (FIG. 3B) for restricting the second member 620, such that the second member 620 can only rotate relative to the first member 610 along the first direction A1.

Figure 4A:
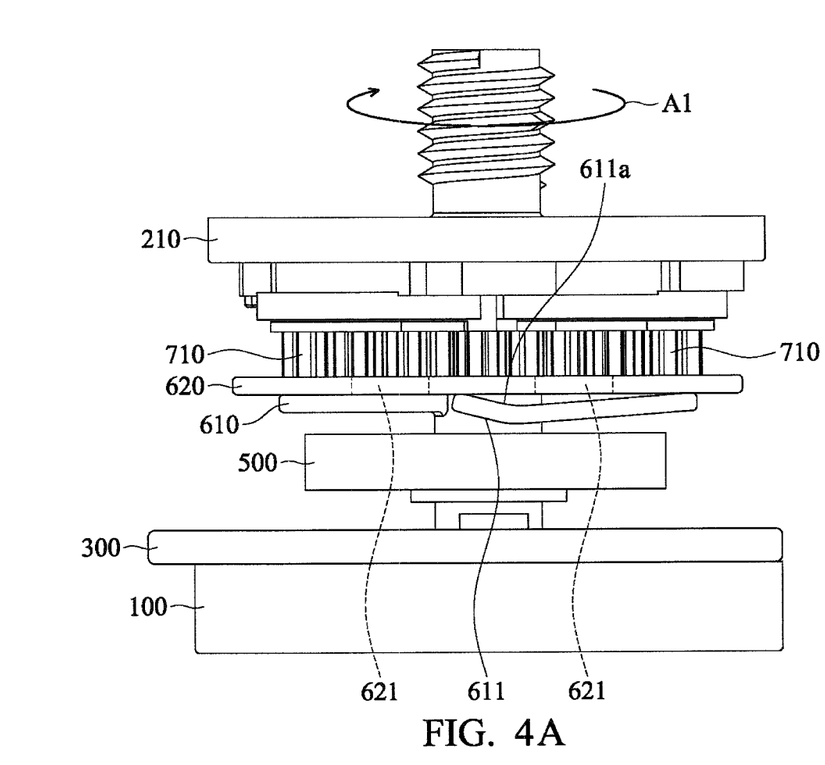
FIG. 4A is a schematic diagram representing the abutting portion sliding out from the recess.
Figure 4B:
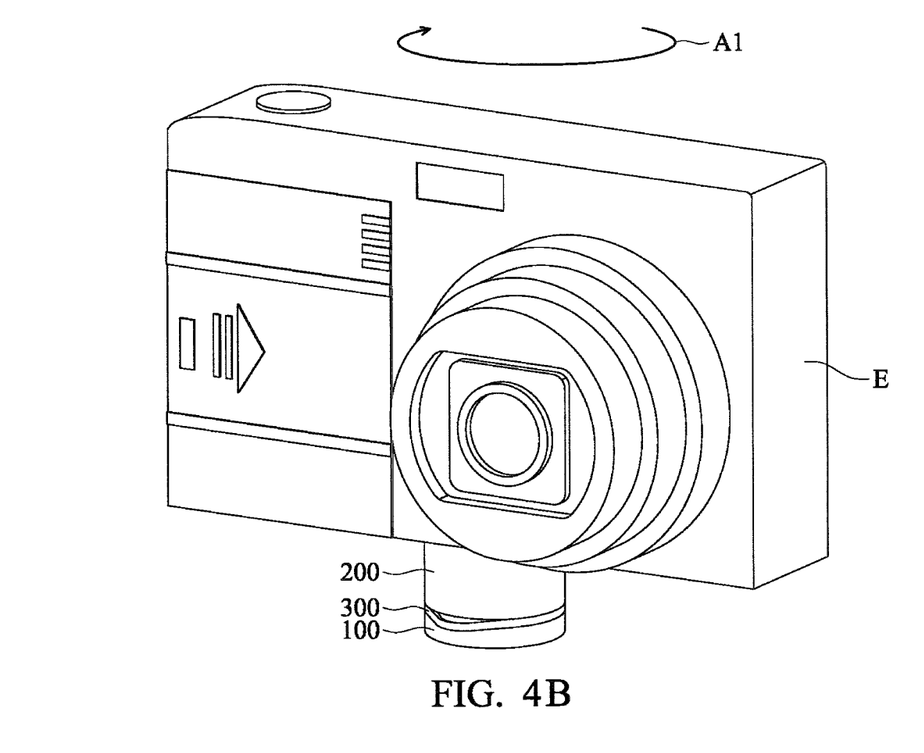
FIG. 4B is a schematic diagram representing a second housing rotating relative to a first housing along a first direction.

Referring to FIGS. 4A and 4B, the user can hold the first housing 100 and apply an external force to rotate the second housing 200 relative to the first housing 100 along the first direction A1. Meanwhile, the first member 610 can smoothly slide out of the recess 621 by the sloping surface 611a, and an elastic potential energy can be stored by extension or compression of the elastic element 500.

Figure 5A:
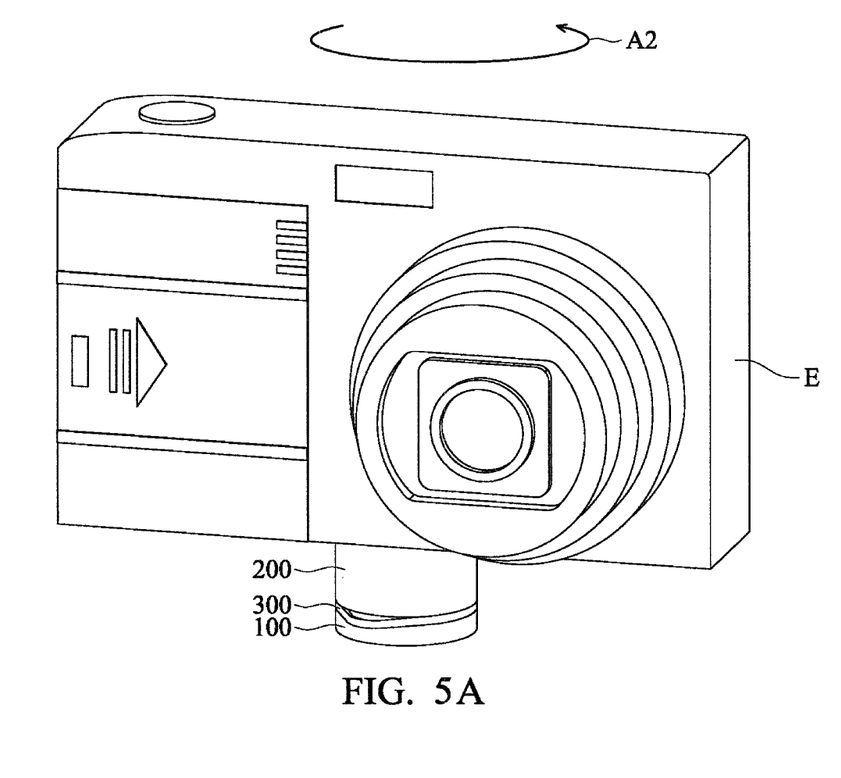
FIG. 5A is a schematic diagram representing the second housing rotating relative to the first housing along a second direction.
Figure 5B:
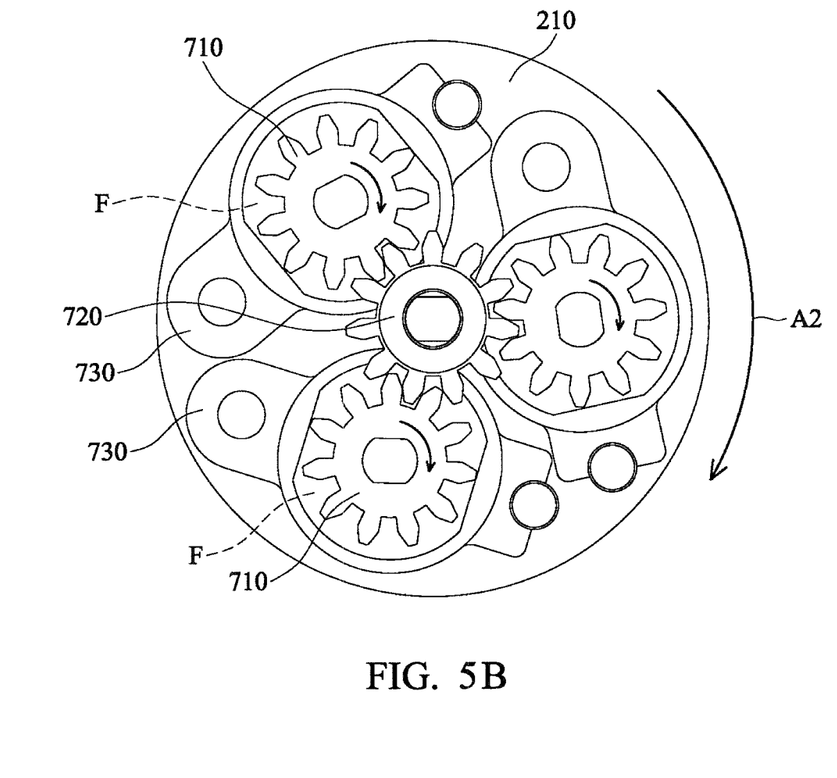
FIG. 5B is a schematic diagram representing the second housing pushing first gears rotating around a second gear.

Referring to FIGS. 5A and 5B, when the external force is released, the second housing 200 rotates relative to the first housing 100 along the second direction A2 by the elastic force provided by the elastic element 500. The abutting portion 611 of the first member 610 slides into the recess 621 and contacts the second member 620, therefore, the second gear 720 cannot rotate counterclockwise relative to the first gears 710 (FIG. 5B). It should be noted that, as shown in FIG. 5B, when the second housing 200 drives the three first gears 710 rotating around the second gear 720 along the second direction A2, the first gears 710 rotate along the second direction A2. Moreover, because the first gears 710 are in contact with the damping fluids F, a damping force opposite to the second direction A2 is generated, such that the rotation speed of the second housing 200 can be reduced to prevent blurry images when recording video or photographing at a excessively high rotation speed. Since there is no motor or circuit in the rotary mechanism, the battery can be omitted, and unexpected vibrations can also be avoided for photographing smoothly.

Figure 6:
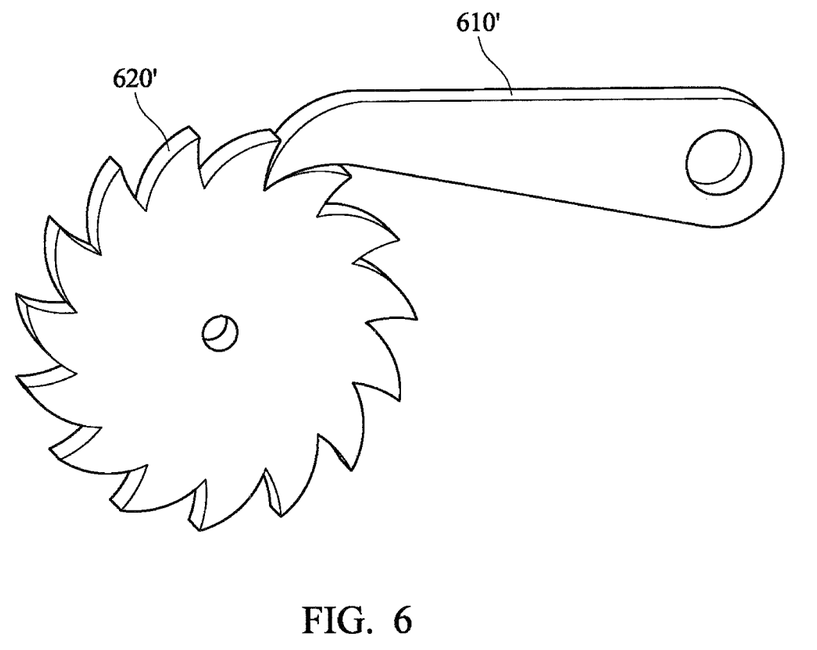
FIG. 6 is a schematic diagram representing a pawl connecting to a the ratchet wheel according to another embodiment of the invention.

It should be noted that, in some embodiments, the aforementioned elements can be replaced by other components having the same functions. For example, as shown in FIG. 6, the unidirectional rotation unit 600 may comprise a pawl 610' and a ratchet wheel 620' respectively connected to the main body B and the second gear 720 in FIG. 2, or respectively connected to the second housing 200 and the second gear 720, so as to achieve unidirectional rotation. In some embodiments, the rotary module 400 may directly contact the damping fluids F in the hollow members 730, wherein the hollow member 730 is fixed to the second housing 200. In some embodiments, the engagement structure 211 may be formed on the first housing 100 to connect the electronic device with the first housing 100 as well.

Figure 7A:
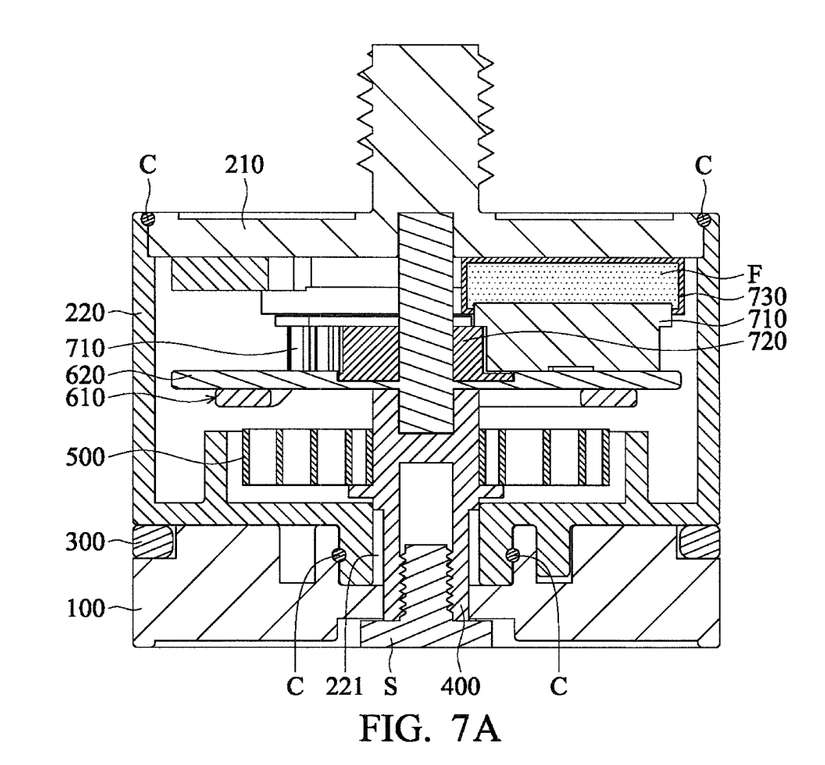
FIG. 7A is a cross-sectional view of a rotary mechanism according to another embodiment of the invention.
Figure 7B:
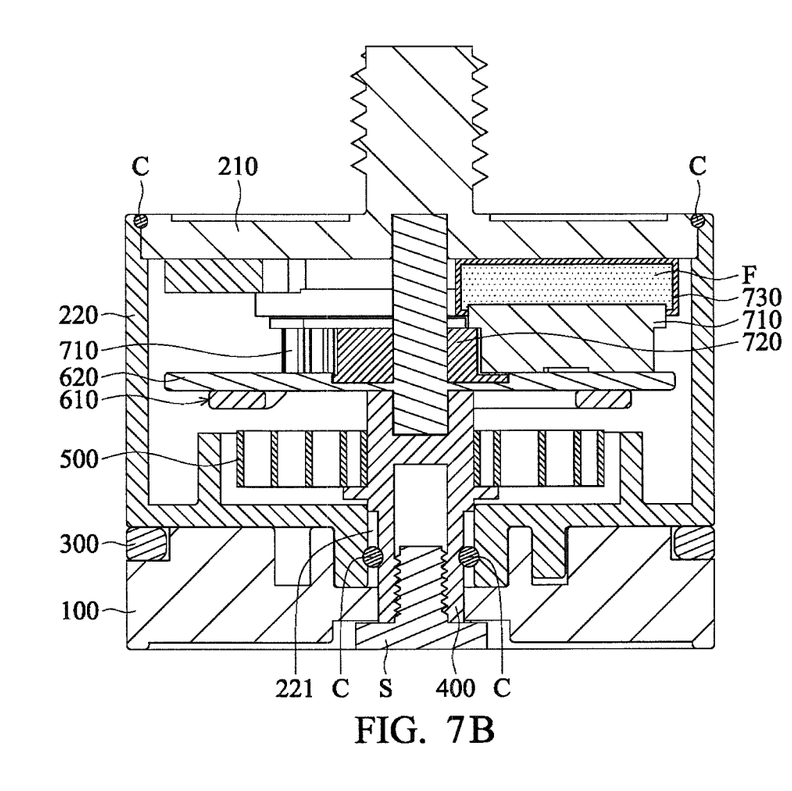
FIG. 7B is a cross-sectional view of a rotary mechanism according to another embodiment of the invention.

Since there is no motor or circuit disposed in the rotary mechanism, the rotary mechanism can be used in water without being damaged. Furthermore, in some embodiments, the rotary mechanism may comprise one or a plurality of sealing rings C to prevent liquid or salt and sand in seawater entering the rotary mechanism, wherein the salt and sand may cause mechanical wear of the elements. As shown in FIGS. 7A and 7B, the sealing rings C can be selectively disposed between the cover 210 and the frame 220 (FIGS. 7A and 7B), the second housing 200 and the first housing 100 (FIG. 7A), or the second housing 200 and the rotary module 400 (FIG. 7B), such that liquid or external objects cannot intrude into the second housing 200.

In summary, a rotary mechanism is provided. According to the speed-reduction module, the rotating speed of the second housing can be reduced, such that the unclear image can be avoided when recording or photographing. Furthermore, since there is no motor or circuit in the rotary mechanism, unexpected vibrations can be also avoided, and since the battery can be omitted, usage is more convenient.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A rotary mechanism for supporting and rotating an electronic device, comprising:
   a first housing;
   a second housing;
   a rotary module, connecting to the first housing and extending therefrom to connect with the second housing;
   an elastic element, connecting the second housing with the rotary module;
   a speed-reduction module, connecting to the rotary module, comprising:
      a hollow member, fixed to the second housing;
      a damping fluid, accommodated in the hollow member; and
      a first gear, extending to the hollow member and contacting the damping fluid; and
   a second gear, fixed to the rotary module and engaged with the first gear, wherein when an external force is exerted on the second housing, and the second housing rotates relative to the first housing along a first direction, the elastic element deforms and stores an elastic potential energy, and when the external force is released, the second housing rotates relative to the first housing along a second direction by an elastic force from the elastic element to release the elastic potential energy, wherein the second direction is opposite to the first direction, and the speed-reduction module reduces the rotary speed of the second housing relative to the first housing.

2. The rotary mechanism as claimed in claim 1, wherein the rotary mechanism further comprises an annular member disposed between the first housing and the second housing and protruding from a side of the second housing.

3. The rotary mechanism as claimed in claim 1, wherein the rotary module further comprises a main body and a unidirectional rotation unit, the main body is fixed to the first housing, and the unidirectional rotation unit comprises a first member and a second member, wherein the first member connects to the main body, the second member connects to the speed-reduction module, and the second member can only rotate relative to the first member along the first direction.

4. The rotary mechanism as claimed in claim 3, wherein the first member is a flexible element, the second member is a rotary element, and the flexible element comprises an abutting portion, wherein the rotary element connects to the second gear and comprises at least one recess for accommodating the abutting portion.

5. The rotary mechanism as claimed in claim 4, wherein when the second housing is rotated relative to the first housing along a first direction by the external force, the abutting portion slides out of the recess, and when the external force is released, the abutting portion rotates along the second direction and slides into the recess.

6. The rotary mechanism as claimed in claim 4, wherein the abutting portion comprises an sloping surface facing the rotary element, and when the second housing is rotated relative to the first housing along the first direction by the external force, the abutting portion slides out of the recess along the sloping surface.

7. The rotary mechanism as claimed in claim 4, wherein the rotary element comprises a plurality of recesses corresponding to a rotation path of the flexible element.

8. The rotary mechanism as claimed in claim 3, wherein the first member extends outward from the main body.

9. The rotary mechanism as claimed in claim 3, wherein the first member is a pawl and the second member is a ratchet wheel.

10. The rotary mechanism as claimed in claim 1, wherein the elastic element is a spring.

11. The rotary mechanism as claimed in claim 10, wherein the spring is a spiral spring or a torsion spring.

12. The rotary mechanism as claimed in claim 10, wherein the spring is disposed around the rotary module.

13. The rotary mechanism as claimed in claim 1, wherein the rotary mechanism further comprises a sealing ring, which is disposed between the second housing and the first housing or between the second housing and the rotary module.

14. The rotary mechanism as claimed in claim 1, wherein the first housing or the second housing comprises an engagement structure for connecting with the electronic device.

15. The rotary mechanism as claimed in claim 14, wherein the rotary mechanism further comprises a sealing ring, and the second housing comprises a disc-shaped cover and a hollow frame, wherein the engagement structure is formed on the cover, and the sealing ring is disposed between the cover and the frame.

16. The rotary mechanism as claimed in claim 1, wherein the rotary module is fixed to the first housing, and the speed-reduction module is fixed to the second housing.

17. The rotary mechanism as claimed in claim 1, wherein the speed-reduction module comprises:
   a hollow member, fixed on the second housing; and
   a damping fluid, accommodated in the hollow member, wherein the rotary module contacts the damping fluid.

18. The rotary mechanism as claimed in claim 1, wherein the electronic device connects to the first housing or the second housing.

* * * * *